United States Patent
Sun

(10) Patent No.: US 9,718,420 B1
(45) Date of Patent: Aug. 1, 2017

(54) INTEGRATED POWER ELECTRONIC DEVICE FOR ELECTRIC VEHICLES

(71) Applicant: Bordrin Motor Corporation, Southfield, MI (US)

(72) Inventor: Xiaobo Sun, Shanghai (CN)

(73) Assignee: BORDRIN MOTOR CORPORATION, INC., Southfield, MI (US)

( * ) Notice: Subject to any disclaimer, the term of this patent is extended or adjusted under 35 U.S.C. 154(b) by 0 days.

(21) Appl. No.: 15/433,150

(22) Filed: Feb. 15, 2017

(51) Int. Cl.
| | | |
|---|---|---|
| *B60L 1/00* | (2006.01) |
| *B60L 3/00* | (2006.01) |
| *H02G 3/00* | (2006.01) |
| *B60R 16/03* | (2006.01) |
| *G07C 5/08* | (2006.01) |
| *B60L 11/18* | (2006.01) |
| *G06F 1/32* | (2006.01) |
| *H01C 7/00* | (2006.01) |

(52) U.S. Cl.
CPC ............ *B60R 16/03* (2013.01); *B60L 11/185* (2013.01); *B60L 11/1811* (2013.01); *G06F 1/3287* (2013.01); *G06F 1/3296* (2013.01); *G07C 5/08* (2013.01); *B60L 2210/10* (2013.01); *H01C 7/008* (2013.01)

(58) Field of Classification Search
USPC .................................................. 307/9.1, 10.1
See application file for complete search history.

(56) References Cited

U.S. PATENT DOCUMENTS

| | | | |
|---|---|---|---|
| 5,504,655 A | 4/1996 | Underwood et al. | |
| 5,534,364 A * | 7/1996 | Watanabe ............. | B60L 3/0046 180/65.1 |
| 9,404,956 B2 | 8/2016 | Tabatowski-Bush | |
| 2009/0103341 A1 | 4/2009 | Lee et al. | |

\* cited by examiner

*Primary Examiner* — Rexford Barnie
*Assistant Examiner* — Xuan Ly
(74) *Attorney, Agent, or Firm* — Brinks Gilson & Lione

(57) ABSTRACT

The present invention relates to an integrated power electronic device for electric vehicles, including an integrated box, a high-voltage cable distribution module, and an intelligent monitoring module. The high-voltage cable distribution module includes a substrate and a multiple channels of high-voltage component connection branches provided on the substrate. The intelligent monitoring module includes a CAN communication circuit provided on the substrate, an auxiliary contact detecting circuit for detecting a working state of the main contactor, an open-box detection circuit for detecting a sealing state of the integrated box, and an isolation detection circuit for detecting insulativity of an electric vehicle. The CAN communication circuit is connected, through a detection data collector, to the auxiliary contact detecting circuit, the open-box detection circuit, the isolation detection circuit, and a vehicle bus, separately.

16 Claims, 4 Drawing Sheets

INTEGRATED POWER ELECTRONIC DEVICE FOR ELECTRIC VEHICLES

BACKGROUND

1. Field of the Invention

The present invention relates to high-voltage electrical component integration in electric vehicles, and in particular, to an integrated power electronic device for electric vehicles.

2. Description of Related Art

There are many high-voltage electrical components on an electric vehicle, such as a battery pack, a high-voltage cable distribution box, an electrical motor controller, an A/C compressor, a positive temperature coefficient (PTC) heater, a DC/DC converter, and an on-board charger. With the rapid but scattered developments of technologies for electric vehicle components, main core components such as the motor controller, the DC/DC converter, a vehicle controller, a battery management system, the high-voltage cable distribution box, and the on-board charger are designed and manufactured by different manufacturers, and are then integrated into a system in a main assembly plant. This practice has obvious advantages. For example, when different components need after-sales services, the manufacturers responsible for the different components may directly analyze and research the respective damaged components conveniently. However, there are also disadvantages as enumerated below.

First, when arranging many separate components in the front compartment of a vehicle, complex placements of various components are involved. Therefore, many mechanical holders are needed, and many snaps are required on the entire vehicle to fix wire harnesses from separate components. Moreover, each component has many complex high-voltage electrical connection lines. As such, the arrangement of the front compartment of the entire vehicle can be very unorganized and convoluted.

Second, processes for developing and verifying/certifying each component may be too cumbersome, adding significant cost and complexity to the system.

Therefore, many prior art integration approaches have emerged. For example, the motor controller, the DC/DC converter, the vehicle controller, the battery management system, the high-voltage cable distribution box, and the on-board charger may be integrated within an integrated box. This integration approach better resolves the problem of unorganized and convoluted arrangement of components in the front compartment. This integration, however, brings some other problems. For example, when a fault occurs to one component, the entire integrated box may need to be replaced, wasting significant resources.

For example, a schematic diagram of a prior art high-voltage cable distribution box is as shown in FIG. 1. Here, positive and negative buses coming from a power battery are connected to the high-voltage cable distribution box via a connector. In turn, these buses are connected, via a main fuse 15, to a main contactor 25 and branch relays 17 to various high-voltage components. Other connection lines are copper bus bars. Each branch is connected to various high-voltage components, such as a motor controller 18, a PTC heater (similar to a heater providing warm air within a passenger compartment of a traditional vehicle) 19, a compressor 20, an on-board fast-charging interface 21, an on-board charger 26, and a DC-DC converter 27.

SUMMARY

An objective of the present invention is providing an integrated power electronic device for electric vehicles that overcomes the foregoing defects existing in the prior art. This reduces the problem that some wire harnesses are complex, provides a highly reliable integration solution, and integrates a comprehensive detection function of main contactor detection—open-box detection, isolation detection, and substrate temperature detection at the same time.

The objective of the present invention may be achieved according to the following technical solutions described in the following paragraphs.

An integrated power electronic device for electric vehicles includes an integrated box, a high-voltage cable distribution module and an intelligent monitoring module provided within the integrated box. The integrated box is provided with a positive power interface, a negative power interface, a joint negative interface for high-voltage components, and a plurality of high-voltage component sub-interfaces. The negative power interface is connected to the joint negative interface for high-voltage components. The high-voltage cable distribution module includes a substrate and multiple channels of high-voltage component connection branches provided on the substrate. One end of each channel of the high-voltage component connection branch is connected to the positive power interface and another end is connected to a high-voltage component sub-interface, separately. One channel of the high-voltage component connection branch is a motor power supply branch provided with a main contactor.

The intelligent monitoring module includes a Controller Area Network (CAN) communication circuit provided on the substrate, an auxiliary contact detecting circuit for detecting a working state of the main contactor, an open-box detection circuit for detecting a sealing state of the integrated box, and an isolation detection circuit for detecting insulativity (e.g., electrical insulation) of an electric vehicle. The CAN communication circuit is connected, through a detection data collector, to the auxiliary contact detecting circuit, the open-box detection circuit, the isolation detection circuit, and a vehicle bus, separately.

The auxiliary contact detecting circuit includes an auxiliary contact switch, a first resistor, and a first voltage detection point. A measurement of the voltage drop can be made from the voltage detection point to the ground. The auxiliary contact switch is provided on the main contactor. One end of the auxiliary contact switch is connected to a ground terminal of the substrate and another end of the auxiliary contact switch is connected to one end of the first resistor. Another end of the first resistor is connected to a power supply terminal of the substrate. The first voltage detection point is provided at a junction of the auxiliary contact switch and the first resistor and is connected to the detection data collector.

The open-box detection circuit includes an open-box detection switch, a second resistor, and a second voltage detection point, where one end of the open-box detection switch is connected to the ground terminal of the substrate. Another end of the open-box detection switch is connected to one end of the second resistor. Another end of the second resistor is connected to the power supply terminal of the substrate. The second voltage detection point is provided at a junction of the open-box detection switch and the second resistor, and is connected to the detection data collector.

The isolation detection circuit includes a MOSFET referred to as "K3", a third resistor, a first isolation resistor, a second isolation resistor, and a third voltage detection point, where one end of the "K3" is connected to the negative power interface and one end of the second isolation resistor, separately. Another end of the "K3" is connected to another end of the third resistor, one end of a third resistor, and a ground terminal of a vehicle chassis, separately. Another end of the fourth resistor is connected to the positive power interface. The third voltage detection point is provided at the negative power interface and is connected to the detection data collector.

A substrate temperature detection circuit provided on the substrate is further included. The substrate temperature detection circuit includes the fourth resistor, a filter capacitor, a thermistor, and a fourth voltage detection point; one end of the fourth resistor is connected to the ground terminal of the substrate and one end of the filter capacitor, separately. Another end of the fourth resistor is connected to another end of the filter capacitor and one end of the thermistor. Another end of the thermistor is connected to a power supply terminal of the substrate. The thermistor is provided to abut against the substrate; and the fourth voltage detection point is provided at a junction of the fourth resistor and the thermistor, and is connected to the detection data collector.

The multiple channels of high-voltage component connection branches further include a main charging branch provided with an on-board charger and a low-voltage battery charging branch provided with a DC-DC converter.

The multiple channels of high-voltage component connection branches further include a PTC power supply branch, a compressor power supply branch, and a fast charging power supply branch.

The positive power interface is connected to the multiple channels of high-voltage component connection branches through a main fuse. The negative power interface is connected to the joint negative interface for high-voltage components through the main fuse.

Each channel of the high-voltage component connection branch is provided with a branch fuse.

The detection data collector may be a single-chip microcomputer.

Compared with the prior art, the present invention has the following advantages as enumerated below.

First, compared with the existing separated power electronic device for electric vehicles, an integrated function module having a high-voltage cable distribution box, a DC-DC converter, and an on-board charger are not separate components and generally cannot be easily damaged, and may be used for a long duration. Moreover, definitions of functions of various components are not related to the functions of power and security protection of an entire vehicle. As such, probability of failure is very small, and personal safety would not be threatened even if a failure occurs.

Second, an intelligent monitoring module for intelligent control is added, such as high-voltage interlocking, isolation detection, an open/closed diagnostic function of the main contactor, and CAN communications. The auxiliary contact detecting circuit may determine an open/closed state of the main contactor. The open-box detection circuit may determine whether a top cover of the integrated box is tightly sealed. The isolation detection circuit may detect, through a connection of a high-voltage part, whether high-voltage isolation within the integrated box satisfies the requirements. Further, the substrate temperature detection circuit may transmit, through a CAN network, various signal states within the integrated box to an exterior controller, such as temperature, voltage, current, and an isolation resistance.

Third, the arrangement of components in a front compartment is optimized. Therefore, holders for fixing are reduced and the problem of arranging the front compartment of the entire vehicle is resolved, processes for designing and verifying a product is shortened, cost is saved, and an excessive waste of resources is reduced.

Fourth, the CAN communication circuit may transmit, through the CAN network, various signal states within the integrated box to an exterior controller on a vehicle bus, where the transmitted information may include temperature, voltage, current, and an isolation resistance. In this way, detection for an inner working state of a power electronic device is achieved, facilitating a user to find failures and problems in a more timely manner.

Fifth, cost for developing a product is reduced, and only one set of molds is required, thereby shortening periods of designing and verification of the product.

Sixth, the positive power interface is connected to multiple channels of high-voltage component connection branches through a main fuse. The negative power interface is connected to the joint negative interface for high-voltage components by using the main fuse. Each channel of the high-voltage component connection branch is provided with a branch fuse and a plurality of fuses are provided so as to ensure a hierarchical fuse protection function at each branch and power interface.

Seventh, each wire harness may be ensured to be clearly connected by providing various function interfaces, thereby effectively avoiding the problem that wires are disorderly arranged, so that the design of an electric vehicle device is more standard.

Further objects, features and advantages of this invention will become readily apparent to persons skilled in the art after a review of the following description, with reference to the drawings and claims that are appended to and form a part of this specification.

DETAILED DESCRIPTION

The present invention is described below in detail with reference to the accompanying drawings and the specific examples. These examples are based on the technical solutions of the present invention, and provide detailed implementations and specific operation processes. However, the protective scope of the present invention is not limited to the following examples.

Figure 1:
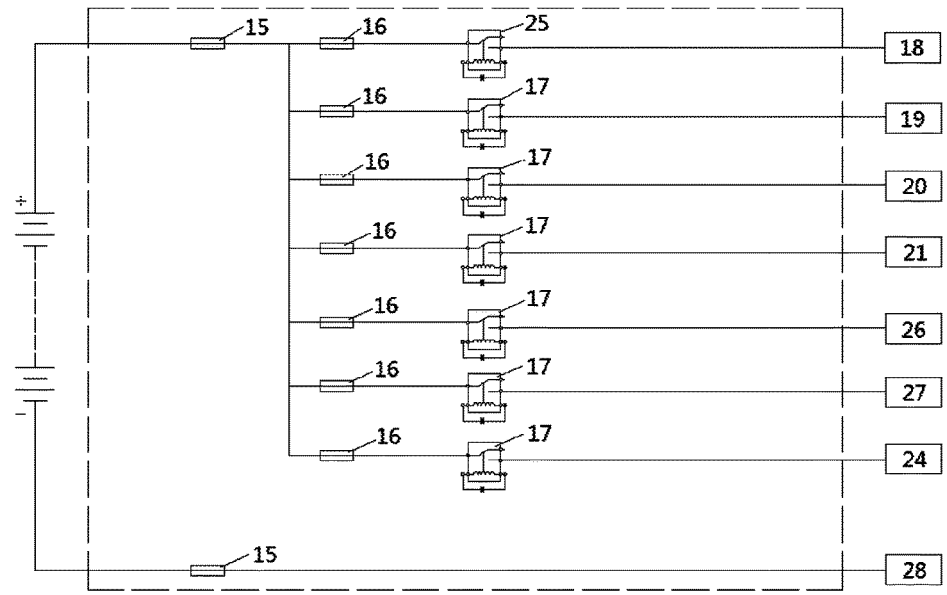
FIG. 1 is a schematic structural diagram of an existing high-voltage cable distribution box.
Figure 2:
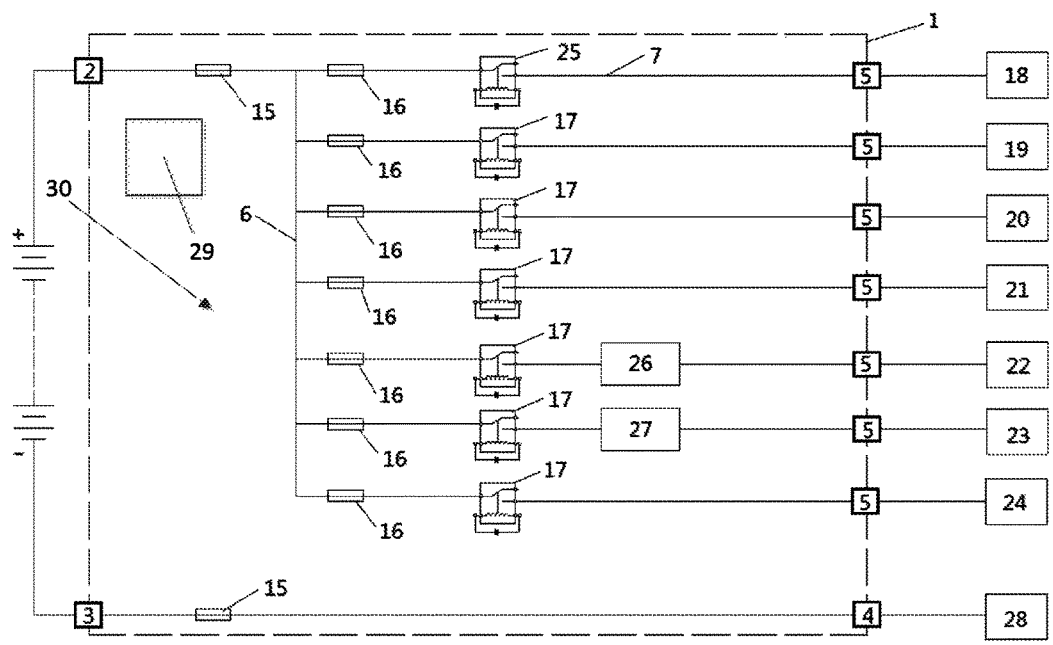
FIG. 2 is a schematic structural diagram of a high-voltage cable distribution module in a device.

As shown in FIG. 2, an integrated power electronic device for an electric vehicles is provided, including an integrated box 1, a high-voltage cable distribution module, and an intelligent monitoring module 29 provided within the integrated box 1. The integrated box 1 is provided with a positive power interface 2, a negative power interface 3, a joint negative power interface 4 for high-voltage components (joint negative power interface 4), and a plurality of high-voltage component sub-interfaces 5. The negative power interface 3 is connected to the joint negative power interface 4, which is in turn connected to a joint negative terminal 28 for high-voltage components. By providing various power interfaces, connection of wire harnesses is facilitated, thereby effectively avoiding the problem that wires are disorderly arranged. In the meanwhile, a housing of the integrated box 1 is provided with a reinforcing rib to ensure compression strength of the housing, thereby effectively avoiding damage to an inner module.

As shown in FIG. 2, the high-voltage cable distribution module includes a substrate 30 and multiple channels provided on the substrate for high-voltage component connection branches 6. One end of each channel of the high-voltage component connection branch 6 is connected to the positive power interface 2, and the other end is connected to a high-voltage component sub-interface 5.

The multiple channels of high-voltage component connection branches 6 include a motor power supply branch 7 provided with a main contactor 25, a main charging branch provided with an on-board charger 26, a low-voltage charging branch provided with a DC-DC converter 27 for a low-voltage battery 23, a PTC heater power supply branch, a power supply branch for a compressor 20, and a fast charging power supply branch. A branch relay 17 is provided on the main charging branch, the low-voltage charging branch for the low-voltage battery 23, the PTC power supply branch, the power supply branch for the compressor 20, and the fast charging power supply branch. The low-voltage charging branch is connected to the low-voltage battery 23 through one of the high-voltage component sub-interfaces 5.

The low-voltage battery 23 may be a lead-acid cell of 12 V. The main charging branch is connected to a main power input interface 22 through one of the high-voltage component sub-interfaces 5, and achieves charging from a main input source. The motor power supply branch 7, the PTC power supply branch, the power supply branch for the compressor 20, and the fast charging power supply branch are connected, through the high-voltage component sub-interfaces 5, to a corresponding motor controller 18, a PTC system 19, the compressor 20, and a fast charging on-board interface 21, respectively.

Remaining high-voltage component connection branches 6 are connected to other high-voltage power utilization devices 24. The positive power interface 2 is connected to the multiple channels of high-voltage component connection branches 6 through a main fuse 15. The negative power interface 3 is connected to the joint negative power interface 4 through the main fuse 15. Each channel of the high-voltage component connection branches 6 is provided with a branch fuse 16 and a plurality of fuses are provided so as to ensure a hierarchical fuse protection at each branch and power interface.

Compared with a traditional high-voltage cable distribution box, integrating the traditional high-voltage cable distribution box, the DC-DC converter 27, and the on-board charger 26 into one integrated box 1 provides a higher degree of integration. In addition, the DC-DC converter 27 and the on-board charger 26 are better protected from damages. In this way, the frequent component failures may be reduced, so that the working stability and lifetime of the integrated components are improved.

Figure 3:
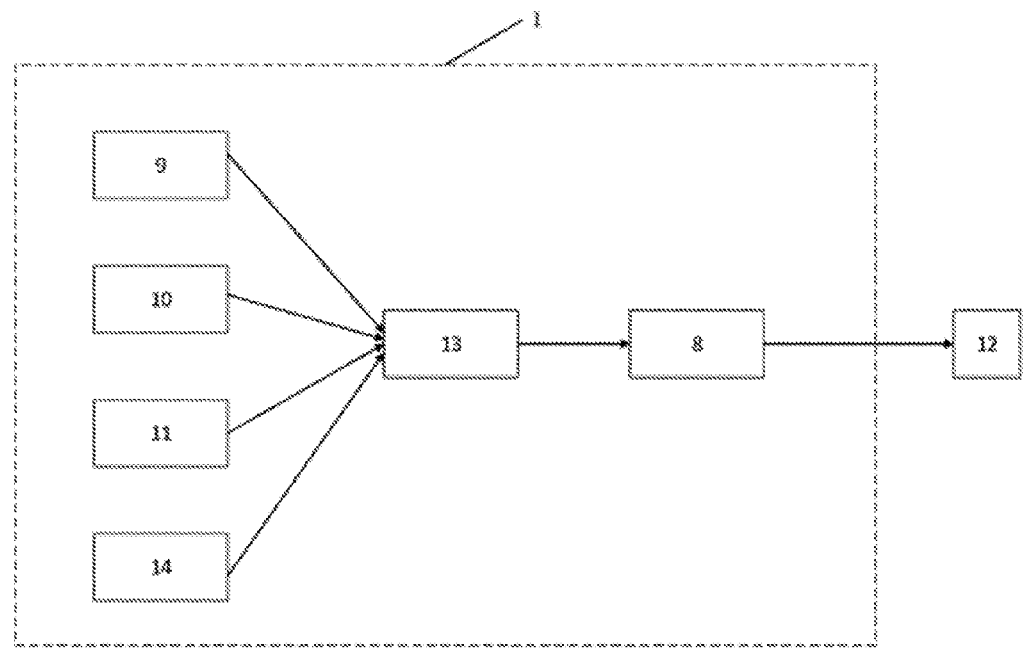
FIG. 3 is a schematic structural diagram of an intelligent monitoring module in a device.

As shown in FIG. 3, the intelligent monitoring module may include a CAN communication circuit 8 provided on the substrate, an auxiliary contact detecting circuit 9 for detecting a working state of the main contactor 25, an open-box detection circuit 10 for detecting a sealing state of the integrated box 1, an isolation detection circuit 11 for detecting insulativity (e.g., electrical insulation) of an electric vehicle, and a substrate temperature detection circuit 14 for detecting working temperature of the substrate. The CAN communication circuit 8 is connected, through a detection data collector 13, to the auxiliary contact detecting circuit 9, the open-box detection circuit 10, the isolation detection circuit 11, the substrate temperature detection circuit 14, and a vehicle bus 12. The CAN communication circuit 8 may transmit, through a CAN network, various signals within the integrated box 1 such as temperature, voltage, current, and isolation resistance signals to an exterior controller 12 on the vehicle bus. In this way, detection for an inner working state of a power electronic device is achieved, facilitating a user to identify failures and problems in time.

Figure 4:
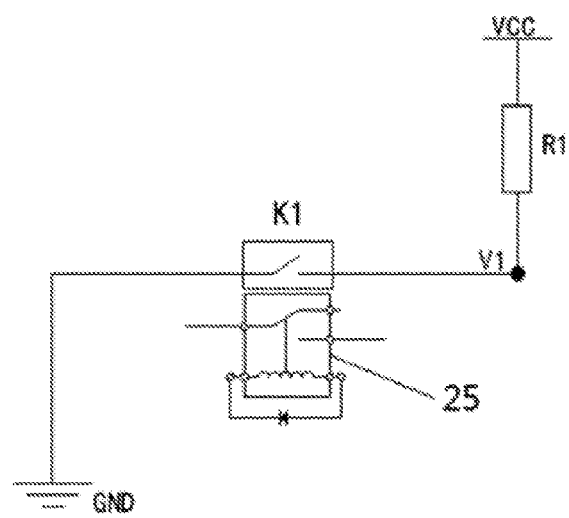
FIG. 4 is a schematic structural diagram of an auxiliary contact detecting circuit in a device.

As shown in FIG. 4, the auxiliary contact detecting circuit 9 may include an auxiliary contact switch K1, a first resistor R1, and a first voltage detection point V1, where the auxiliary contact switch K1 is provided adjacent to the main contactor 25. One end of the auxiliary contact switch K1 is connected to a ground terminal GND of the substrate, and another end of the auxiliary contact switch K1 is connected to one end of the first resistor R1. Another end of the first resistor R1 is connected to a power supply terminal VCC of the substrate. The first voltage detection point is provided at a junction between the auxiliary contact switch K1 and the first resistor R1, and is connected to the detection data collector 13.

In FIG. 4, V1 is a to-be-detected voltage of the first voltage detection point. When a coil of the main contactor 25 is powered on, the auxiliary contact switch K1 is pulled close, and a level of V1 at this time is 0 V. When the coil of the main contactor 25 is powered off, the auxiliary contact switch K1 opens, and V1 at this time is at a higher level. Therefore, a working state of the main contactor 25 may be quickly and conveniently detected according to the level of V1. The detection data collector 13 may be a single-chip microcomputer which achieves data acquisition, analog-to-digital conversion, and data forwarding of multiple input channels.

Figure 5:
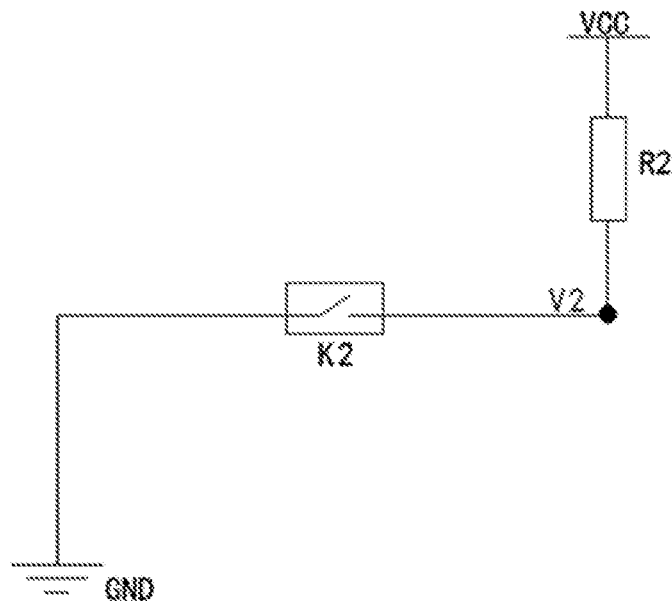
FIG. 5 is a schematic structural diagram of an open-box detection circuit in a device.

As shown in FIG. 5, the open-box detection circuit 10 includes an open-box detection switch K2, a second resistor R2, and a second voltage detection point, where one end of the open-box detection switch K2 is connected to the ground terminal GND of the substrate. Another end of the open-box detection switch K2 is connected to one end of the second resistor R2. Another end of the second resistor R2 is connected to the power supply terminal VCC of the substrate; and the second voltage detection point is provided at a junction between the open-box detection switch K2 and the second resistor R2, and is connected to the detection data collector 13.

In FIG. 5, V2 is a to-be-detected voltage of the second voltage detection point. When the open-box detection switch K2 is closed, a detected value of V2 is at a low level; and when the open-box detection switch K2 is open, the detected value of V2 is at a higher level. Moreover, connection and disconnection of the open-box detection switch K2 may be caused by opening and closing of a cover. Therefore, whether a top cover of the integrated box 1 is closed is determined according to the open-box detection circuit 10.

The open-box detection switch K2 may contain a top cover conductor and a box body conductor. The top cover conductor is provided on the top cover of the integrated box 1, and the box body conductor is provided on a box body of the integrated box 1. When the top cover and the box body are in tight contact, the top cover conductor and the box body conductor would be in contact and connected to form a closed switch K2.

The open-box detection switch K2 may alternatively be a pressure contact switch which is provided on the box body. A protrusion which may touch the pressure contact switch is provided on the top cover. When the top cover and the box body are in tight contact, the protrusion presses the pressure contact switch so as to achieve closing of the pressure contact switch K2.

Figure 6:
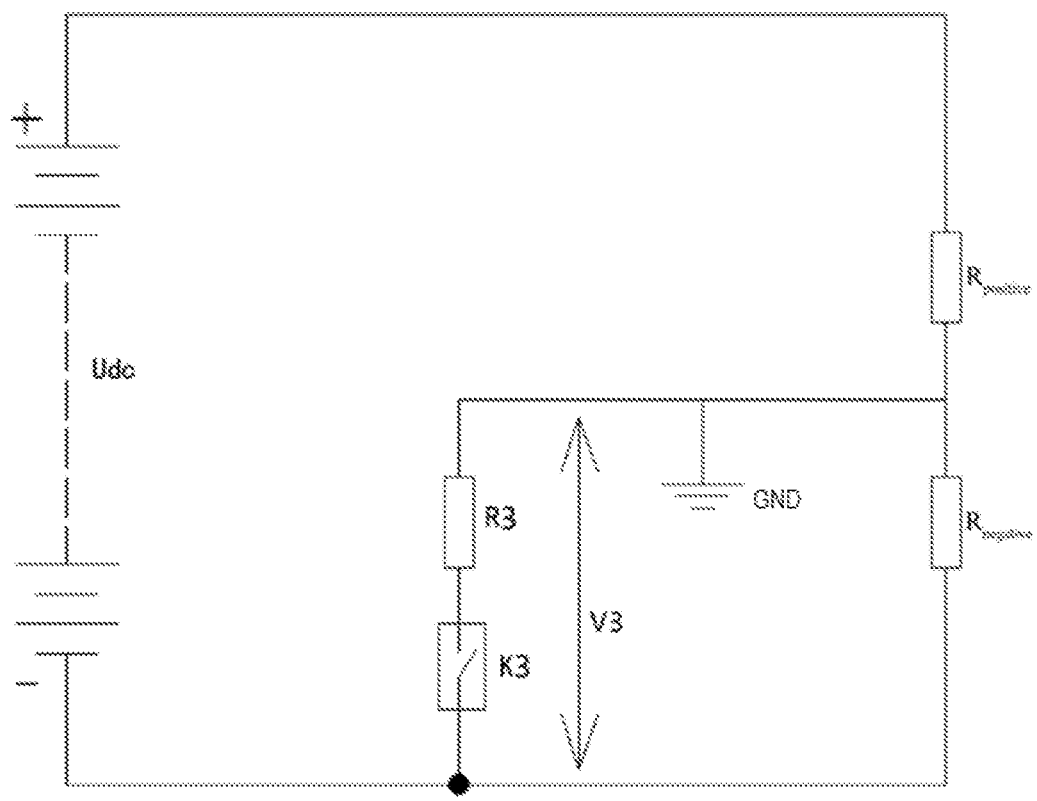
FIG. 6 is a schematic structural diagram of an isolation detection circuit in a device.

As shown in FIG. 6, the isolation detection circuit 11 includes a K3, a third resistor R3, a first isolation resistor $R_{positive}$, a second isolation resistor $R_{negative}$, and a third voltage detection point, where one end of the K3 is connected to the negative power interface 3 and one end of the second isolation resistor $R_{negative}$. Another end of the K3 is connected to one end of the third resistor R3. Another end of the third resistor R3 is connected to a ground terminal GND of a vehicle chassis and one end of $R_{positive}$ and one end of $R_{negative}$. Another end of $R_{positive}$ is connected to the positive power interface 2. Another rend of $R_{negative}$ is connected to the negative power interface 3. The third voltage detection point is provided at the negative power interface 3, and is connected to the detection data collector 13. The first isolation resistor $R_{positive}$ represents an isolation resistance between the positive electrode of the battery and the vehicle body (chassis), and the second isolation resistor $R_{negative}$ represents an isolation resistance between the negative electrode of the battery and the vehicle body. When the K3 is closed, $$V3=U_{dc}*(R3//R_{negative})/(R_{positive}+R3//R_{negative}) \ldots$$
"//" operates to obtain a parallel resistance value of two resistors.

When the K3 is open, $$V3=U_{dc}*R_{negative}/(R_{positive}+R_{negative})$$

Here, $U_{dc}$ is a battery voltage, and the third voltage detection point detects a value of V3. Therefore, values of the $R_{positive}$ and the $R_{negative}$ may be calculated according to the foregoing equations, where the two values correspond to isolation resistances of the battery electrodes to the vehicle body, and reflect isolation states of an electric vehicle.

Figure 7:
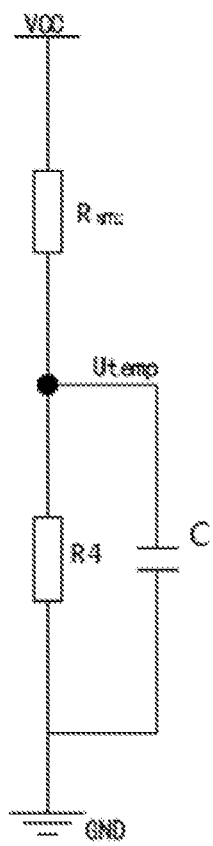
FIG. 7 is a schematic structural diagram of a substrate temperature detection circuit in a device.

As shown in FIG. 7, the substrate temperature detection circuit 14 includes the fourth resistor R4, a filter capacitor C, a thermistor $R_{NTC}$, and a fourth voltage detection point, where one end of the fourth resistor R4 is connected to the ground terminal GND of the substrate and one end of the filter capacitor C. Another end of the fourth resistor R4 is connected to another end of the filter capacitor C and one end of the thermistor $R_{NTC}$. Another end of the thermistor $R_{NTC}$ is connected to a power supply terminal VCC of the substrate. The thermistor $R_{NTC}$ is provided to abut against the substrate. The fourth voltage detection point is provided at a junction between the fourth resistor R4 and the thermistor $R_{NTC}$, and is connected to the detection data collector 13.

The thermistor in this example may be a negative temperature coefficient (NTC) thermistor. $U_{temp}$ represents a voltage value collected by the fourth voltage detection point. A value of the NTC thermistor may be calculated according to the following formula: $U_{temp}=VCC*R4/(R4+R_{NTC})$. Then, temperature of the substrate may be obtained by looking up a table of correspondence between resistance and temperature of the NTC, so as to detect inner temperature of the entire box. If the temperature remains high during a period of time, a warning for abnormal operation may be issued.

In the above implementation of the integrated box 1 containing the DC-DC converter 27 and on-board charger 26, a plurality of monitoring functions are integrated by providing an intelligent monitoring module. These monitoring functions include:

Auxiliary detection, for determining an open/closed state of the main contactor 25;

Open-box detection, for determining whether the top cover of the integrated box 1 is tightly sealed;

Isolation detection, for detecting, through a connection of a high-voltage part, whether high-voltage isolation within the integrated box 1 satisfies some predetermined requirements; and CAN communications, for transmitting, through the CAN network, various detection signal within the integrated box 1, such as temperature, voltage, current, and an isolation resistance, to an exterior controller.

In an alternative example, dedicated hardware implementations, such as application specific integrated circuits, programmable logic arrays and other hardware devices, can be constructed to implement one or more of the methods described herein. Applications that may include the apparatus and systems of various examples can broadly include a variety of electronic and computer systems. One or more examples described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various examples of the present disclosure, the methods described herein may be implemented by software programs executable by a computer system. Further, in an exemplary, non-limited example, implementations can include distributed processing, component/object distributed processing, and parallel processing. Alternatively, virtual computer system processing can be constructed to implement one or more of the methods or functionality as described herein.

Further the methods described herein may be embodied in a computer-readable medium. The term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

As a person skilled in the art will readily appreciate, the above description is meant as an illustration of the principles of this invention. This description is not intended to limit the scope or application of this invention in that the invention is susceptible to modification, variation and change, without departing from spirit of this invention, as defined in the following claims.

The invention claimed is:

1. An integrated power electronic device for an electric vehicle, comprising:
 an integrated box, a high-voltage cable distribution module, and an intelligent monitoring module provided within the integrated box;
 wherein the integrated box is provided with a positive power interface, a negative power interface, a joint negative interface for high-voltage components, and a plurality of high-voltage component sub-interfaces;

the negative power interface is connected to the joint negative interface for high-voltage components;

the high-voltage cable distribution module comprises a substrate and multiple channels of high-voltage component connection branches provided on the substrate;

one end of each channel of the high-voltage component connection branch is connected to the positive power interface, and another end is connected to a high-voltage component sub-interface, separately;

one channel of the high-voltage component connection branch (6) is a motor power supply branch provided with a main contactor;

the intelligent monitoring module comprises a CAN communication circuit provided on the substrate, an auxiliary contact detecting circuit for detecting a working state of the main contactor, an open-box detection circuit for detecting a sealing state of the integrated box, and an isolation detection circuit for detecting insulativity of an electric vehicle; and the CAN communication circuit is connected, through a detection data collector (13), to the auxiliary contact detecting circuit, the open-box detection circuit, the isolation detection circuit, and a vehicle bus, separately.

2. The integrated power electronic device of claim 1, wherein the auxiliary contact detecting circuit comprises:

an auxiliary contact switch, a first resistor, and a first voltage detection point;

the auxiliary contact switch is provided on the main contactor;

one end of the auxiliary contact switch is connected to a ground terminal of the substrate, and another end of the auxiliary contact switch is connected to one end of the first resistor;

another end of the first resistor is connected to a power supply terminal of the substrate; and the first voltage detection point is provided at a junction of the auxiliary contact switch and the first resistor, and is connected to the detection data collector.

3. The integrated power electronic device of claim 1, wherein the open-box detection circuit comprises:

an open-box detection switch, a second resistor, and a second voltage detection point;

one end of the open-box detection switch is connected to the ground terminal of the substrate, and another end of the open-box detection switch is connected to one end of the second resistor; another end of the second resistor is connected to the power supply terminal of the substrate; and the second voltage detection point is provided at a junction of the open-box detection switch and the second resistor, and is connected to the detection data collector.

4. The integrated power electronic device of claim 1, wherein the isolation detection circuit comprises:

a MOSFET, a third resistor, a first isolation resistor, a second isolation resistor, and a third voltage detection point;

one end of the MOSFET is connected to the negative power interface and one end of the second isolation resistor, separately;

another end of the MOSFET is connected to another end of the third resistor, one end of a third resistor, and a ground terminal of a vehicle chassis, separately;

another end of the third resistor is connected to the positive power interface; and the third voltage detection point is provided at the negative power interface, and is connected to the detection data collector.

5. The integrated power electronic device of claim 1, further comprising:

a substrate temperature detection circuit provided on the substrate;

the substrate temperature detection circuit comprises a fourth resistor, a filter capacitor, a thermistor, and a fourth voltage detection point;

one end of the fourth resistor is connected to the ground terminal of the substrate and one end of the filter capacitor, separately;

another end of the fourth resistor is connected to another end of the filter capacitor and one end of the thermistor;

another end of the thermistor is connected to a power supply terminal of the substrate;

the thermistor is provided to abut against the substrate; and the fourth voltage detection point is provided at a junction of the fourth resistor and the thermistor, and is connected to the detection data collector.

6. The integrated power electronic device of claim 1, wherein the multiple channels of high-voltage component connection branches further comprise a main charging branch provided with an on-board charger and a low-voltage battery charging branch provided with a DC-DC converter.

7. The integrated power electronic device of claim 1, wherein the multiple channels of high-voltage component connection branches further comprise a PTC power supply branch, a compressor power supply branch, and a fast charging power supply branch.

8. The integrated power electronic device of claim 1, wherein the positive power interface is connected to the multiple channels of high-voltage component connection branches through a main fuse; and the negative power interface is connected to the joint negative interface for high-voltage components through the main fuse (15).

9. The integrated power electronic device of claim 1, wherein each channel of the high-voltage component connection branch is provided with a branch fuse.

10. The integrated power electronic device for electric vehicles according to claim 1, wherein the detection data collector is a single-chip microcomputer.

11. An integrated power electronic device for an electric vehicle comprises:

an integrated box, a high-voltage cable distribution module, and an intelligent monitoring module provided within the integrated box;

wherein the integrated box is provided with a positive power interface, a negative power interface, a joint negative interface for high-voltage components, and a plurality of high-voltage component sub-interfaces;

the negative power interface is connected to the joint negative interface for high-voltage components;

the high-voltage cable distribution module comprises a substrate and multiple channels of high-voltage component connection branches provided on the substrate;

one end of each channel of the high-voltage component connection branch is connected to the positive power interface, and another end is connected to a high-voltage component sub-interface, separately;

one channel of the high-voltage component connection branch (6) is a motor power supply branch provided with a main contactor;

the intelligent monitoring module comprises a CAN communication circuit provided on the substrate, an auxiliary contact detecting circuit for detecting a working state of the main contactor, an open-box detection circuit for detecting a sealing state of the integrated box, and an isolation detection circuit for detecting insulativity of an electric vehicle;

the CAN communication circuit is connected, through a detection data collector (13), to the auxiliary contact detecting circuit, the open-box detection circuit, the isolation detection circuit, and a vehicle bus, separately;

wherein the auxiliary contact detecting circuit comprises:
  an auxiliary contact switch, a first resistor, and a first voltage detection point,
  the auxiliary contact switch is provided on the main contactor;
  one end of the auxiliary contact switch is connected to a ground terminal of the substrate, and another end of the auxiliary contact switch is connected to one end of the first resistor,
  another end of the first resistor is connected to a power supply terminal of the substrate, and
  the first voltage detection point is provided at a junction of the auxiliary contact switch and the first resistor, and is connected to the detection data collector;

wherein the open-box detection circuit comprises:
  an open-box detection switch, a second resistor, and a second voltage detection point,
  one end of the open-box detection switch is connected to the ground terminal of the substrate, and another end of the open-box detection switch is connected to one end of the second resistor; another end of the second resistor is connected to the power supply terminal of the substrate, and
  the second voltage detection point is provided at a junction of the open-box detection switch and the second resistor, and is connected to the detection data collector;

wherein the isolation detection circuit comprises:
  a MOSFET, a third resistor, a first isolation resistor, a second isolation resistor, and a third voltage detection point,
  one end of the MOSFET is connected to the negative power interface and one end of the second isolation resistor, separately,
  another end of the MOSFET is connected to another end of the third resistor, one end of a third resistor, and a ground terminal of a vehicle chassis, separately,
  another end of the third resistor is connected to the positive power interface, and
  the third voltage detection point is provided at the negative power interface, and is connected to the detection data collector.

12. The integrated power electronic device of claim 11, wherein the multiple channels of high-voltage component connection branches further comprise a main charging branch provided with an on-board charger and a low-voltage battery charging branch provided with a DC-DC converter.

13. The integrated power electronic device of claim 11, wherein the multiple channels of high-voltage component connection branches further comprise a PTC power supply branch, a compressor power supply branch, and a fast charging power supply branch.

14. The integrated power electronic device of claim 11, wherein the positive power interface is connected to the multiple channels of high-voltage component connection branches through a main fuse; and the negative power interface is connected to the joint negative interface high-voltage components through the main fuse.

15. The integrated power electronic device of claim 11, wherein the each channel of the high-voltage component connection branch is provided with a branch fuse.

16. The integrated power electronic device for electric vehicles according to claim 11, wherein the detection data collector is a single-chip microcomputer.

* * * * *